US008516874B2

(12) United States Patent
Moore et al.

(10) Patent No.: US 8,516,874 B2
(45) Date of Patent: Aug. 27, 2013

(54) PILLAR FOR MOTOR VEHICLE AND TOOL FOR MAKING THE SAME

(75) Inventors: Jaime Nicole Moore, Canton, MI (US); Stuart W. Bailey, Tecumseh, MI (US); Nobiaki Kitaura, Aichi-Ken (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 412 days.

(21) Appl. No.: 12/815,192

(22) Filed: Jun. 14, 2010

(65) Prior Publication Data

US 2010/0314910 A1 Dec. 16, 2010

Related U.S. Application Data

(63) Continuation-in-part of application No. 11/965,059, filed on Dec. 27, 2007, now Pat. No. 7,735,907.

(51) Int. Cl.
*B21J 9/18* (2006.01)

(52) U.S. Cl.
USPC ................. 72/452.9; 72/312; 72/313; 72/381

(58) Field of Classification Search
USPC ................... 72/347, 348, 350, 380, 381, 383, 72/452.9, 313
See application file for complete search history.

(56) References Cited

U.S. PATENT DOCUMENTS 4,002,049 A 1/1977 Randolph, Sr.
4,535,619 A 8/1985 Gargrave
5,347,838 A * 9/1994 Matsuoka ....................... 72/313
5,431,590 A 7/1995 Abbas
5,746,082 A 5/1998 Matsuoka
5,784,916 A 7/1998 Matsuoka
6,038,908 A 3/2000 Kinoshita
6,196,040 B1 3/2001 Matsuoka
6,230,536 B1 5/2001 Matsuoka
6,240,671 B1 6/2001 Galfidi, Jr.
6,499,478 B1 12/2002 Perez
6,539,766 B2 4/2003 Matsuoka
6,578,909 B1 6/2003 Reed et al.
6,619,095 B2 9/2003 Matsuoka
7,243,524 B2 * 7/2007 Kinoshita ....................... 72/381
7,290,831 B2 11/2007 Poss et al.
7,624,615 B2 * 12/2009 Nieschulz .................... 72/452.9
7,665,341 B2 * 2/2010 Kinoshita ....................... 72/381

* cited by examiner

*Primary Examiner* — Dana Ross
*Assistant Examiner* — Homer Boyer
(74) *Attorney, Agent, or Firm* — Gifford, Krass, Sprinkle, Anderson & Citkowski, P.C.

(57) ABSTRACT

A stamping tool for forming a stamped metal panel used as part of a pillar of a motor vehicle is provided. The stamped metal panel is arcuate and has a u-shaped cross-section, the arcuate panel including a transitional portion so as to avoid a die lock condition. The tool includes an upper die, and a lower die, and transitional portion surfaces. The transitional portion surfaces tapers as the transitional portion surface extends from the ends of respective upper and lower dies to a first point. The transitional portion is substantially tangential with at least the first wall surfaces of the dies to facilitate removal of the panel from between upper and lower dies of a stamping tool.

8 Claims, 10 Drawing Sheets

10
16
60
12
3
3

22
32
23
20
33
54
52
32
30
24
40

32
54
52
32b
32a
50
40
30
20

78
30
50
32
54
52
32a
32b
82
80
274
40

20
50
52
30
24
40
32
54
9
9
10
10
11
11

270
76
272
104
100
30
50
120
122
110
40
102
52
114
106
118
124
32a
112
78
128
32
L1
274
32b
54
86
126
108
80
82

270
76
272
104
100
30
50
120
122
102
40
52
110
124
114
106
118
32a
112
78
128
L2
32b
274
126
54
108
86
80
82

PILLAR FOR MOTOR VEHICLE AND TOOL FOR MAKING THE SAME

CROSS-REFERENCE TO RELATED APPLICATIONS

This application is a Continuation-in-part of application Ser. No. 11/965,059 filed on Dec. 27, 2007.

FIELD OF THE INVENTION

The invention relates to stamped metal panels for motor vehicles. More particularly, the invention relates to a stamped pillar and a tool for making the same.

BACKGROUND OF THE INVENTION

Rotary cams are typically used in stamping tools when it is necessary to form a negative angle in a stamped metal panel. A negative angle means that a flange bends back toward a main portion of the stamping. The rotary cam is a die which can be rotated after the part is stamped to permit removal of the workpiece from the stamping machine. Styling and design of panels for motor vehicles can be limited by the location of the cam. In forming curved pillars for motor vehicles, for example, a step may be provided along a window support flange of the pillar to avoid a die-lock condition as the rotary cam is rotated after formation of the pillar and, thereby, offer more flexibility in terms of styling/design and cam placement. The use of such a step, however, can conflict with a desire to maintain a generally flat window seal surface along the window support flange and minimize flange length. The step can also adversely affect the glass edge condition or clearance, or side wall sealing condition.

Thus, it remains desirable to provide an improved stamped panel or pillar design that allows for greater styling flexibility, while meeting certain tooling requirement and/or design criteria, such as flat window seal surface. It also remains desirable to utilize as few cams as possible in the stamping process.

SUMMARY OF THE INVENTION

According to one aspect of the invention, a stamped metal panel is provided for use as part of a pillar of a motor vehicle. The pillar extends along a window or windshield of the motor vehicle. The pillar has a generally U-shaped cross section formed by a main wall, an outer side wall and an inner side wall. The inner side wall has a first wall that extends from the main wall. The inner side wall also has a second wall that extends from an end of the first wall and supports a side of the window. The pillar includes a transitional portion that extends arcuately between the first wall and the second wall and is substantially tangential with the first wall of the inner side wall.

According to another aspect of the invention, a stamping tool includes an upper die and a lower die cooperative to form the above panel. The lower die includes a first part forming the outer side wall and a second part forming the inner side wall. The second part of the lower die is rotatable about a rotational axis positioned along a line that is generally parallel with the second wall and that extends through an intersection between the first wall and the transitional portion as defined in a cross section that extends transversely through the panel and is generally orthogonal to the rotational axis.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
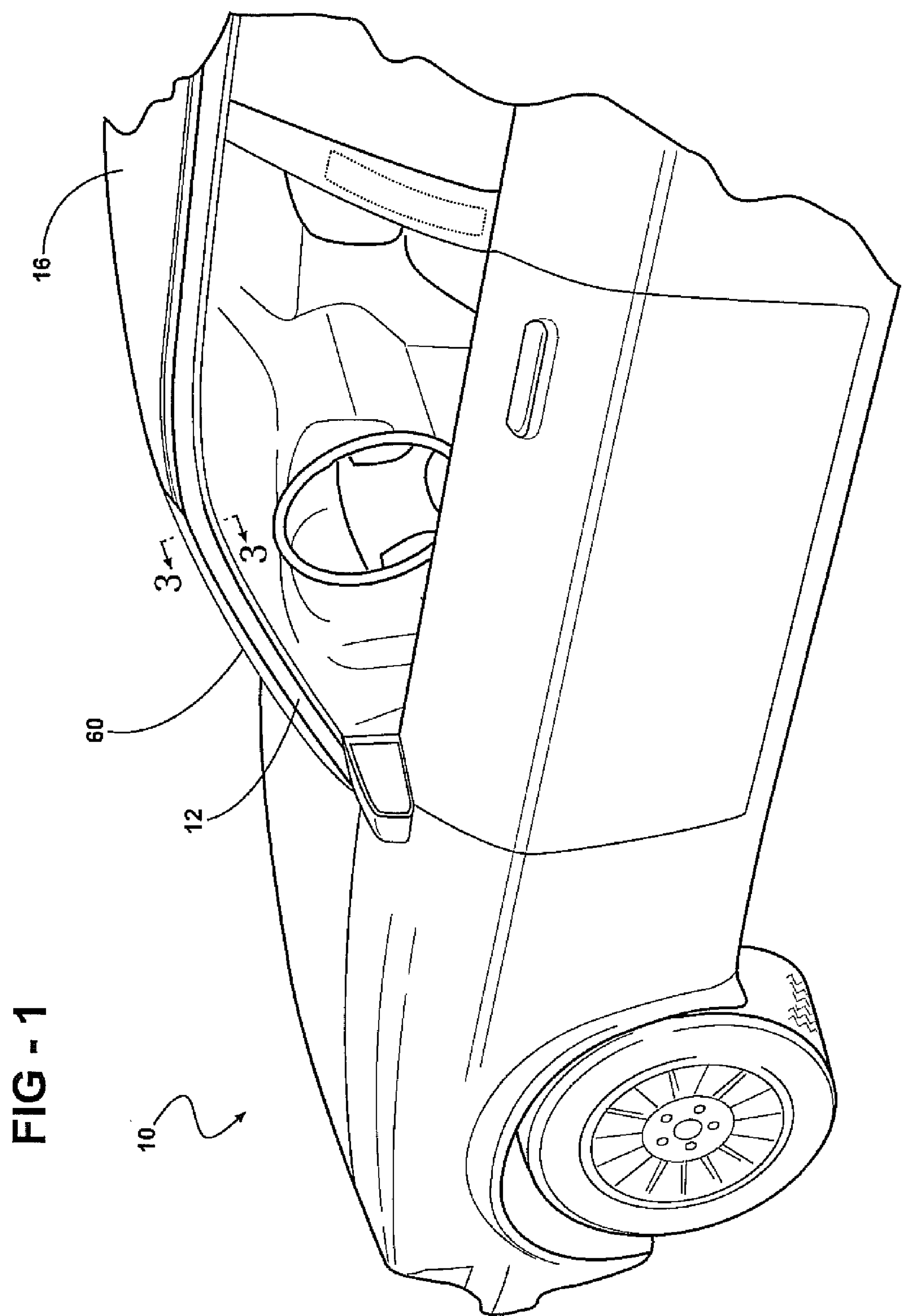
FIG. 1 is a perspective view of a motor vehicle enlarged to show a stamped panel according to one embodiment of the invention.

Referring to FIG. 1, a motor vehicle is generally indicated at 10. The motor vehicle 10 includes generally upright pillars 12 extending between a "beltline" of the vehicle body and the roof 16. Described in greater detail below, the invention provides a design for a stamped panel that is used as part of the pillar 12 and a tool 70 for making the same or other similarly shaped stamped panels for use on the motor vehicle 10.

Figures 2, 3:
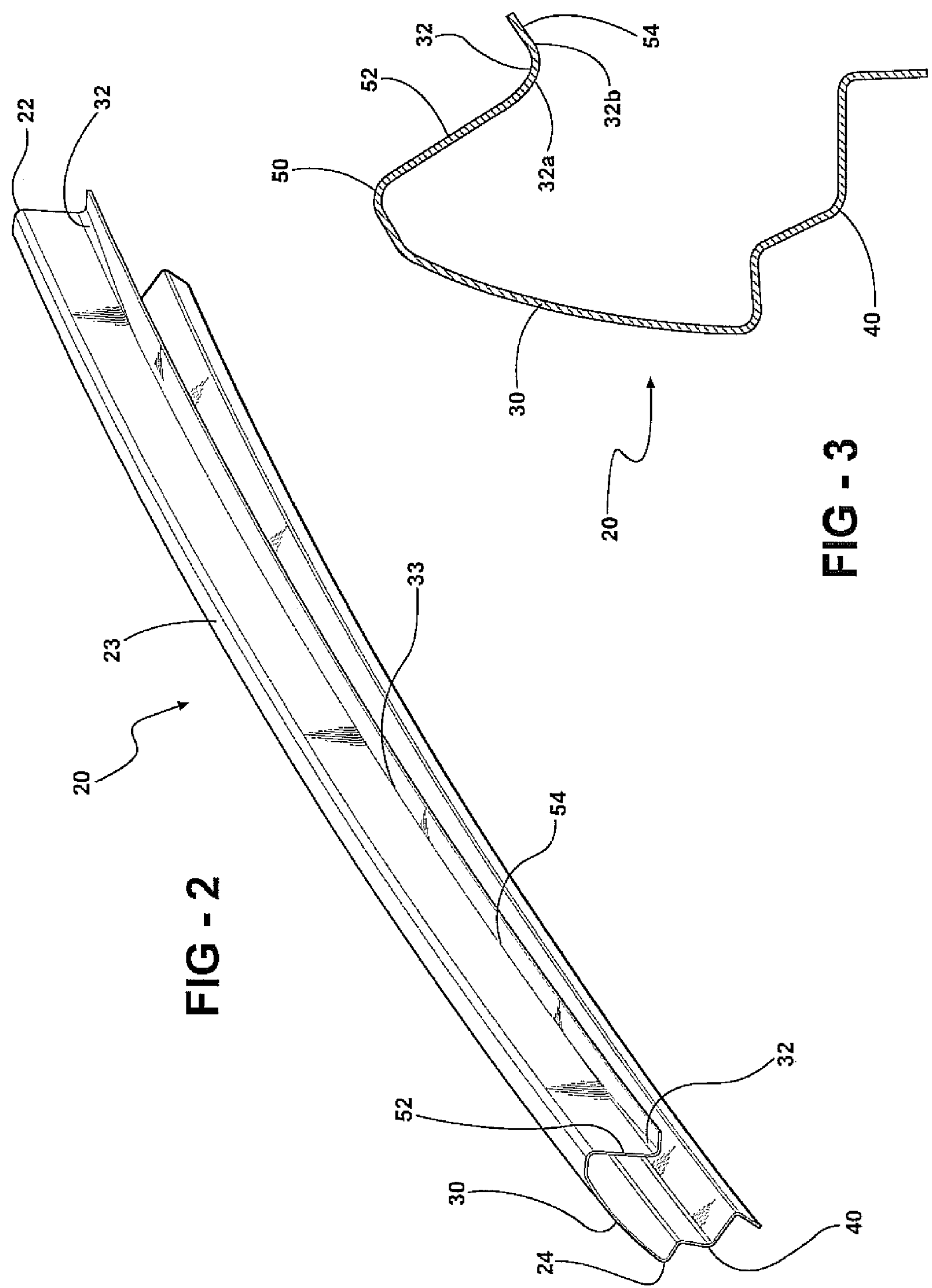
FIG. 2 is a perspective view of the panel.
FIG. 3 is a cross sectional view of the panel as taken through the line indicated at 3-3 in FIG. 1.

Referring to FIG. 2, a panel according to one embodiment of the invention is indicated at 20. The panel 20 forms at least a portion of one of the pillars 12 and/or a portion of a side outer body panel or other similar panel. The panel 20 has a body 23 extending between opposite top and bottom ends 22, 24. The panel 20 extends longitudinally along a curve between the top and bottom ends 22, 24.

Referring to FIG. 3, the panel 20 has a generally U-shaped cross section defined by a main wall 30, an outer side wall 40 and an inner side wall 50. The side walls 40, 50 extend from respective outer and inner sides of the main wall 30. The inner side wall 50 includes a bent portion having a first wall 52 and a second wall 54. The second wall 54 is disposed on an opposite end of the first wall 52 from the main wall 30. The second wall 54 extends generally orthogonally from the first wall 52 and supports a windshield, window or glass 60 (FIG. 1). Preferably, the first wall 52 is substantially flat to provide a sealing surface for the glass 60.

The first wall 52 extends toward the other of the side wall 50 at a generally acute angle relative to the main wall 30. This results in a "negative angle" which poses the potential for a die lock condition during the formation of the panel. As such, a pivoting cam arrangement is provided in a stamping tool 70 to form the panel, which allows removal of the panel from the tool 70 after the panel is formed. Further, a transitional portion is formed in the panel, which provides increased flexibility in the design of the pivoting cam and location of the rotational axis for the pivoting cam in the tool 70.

A transitional portion 32 is formed between the first wall 52 and the second wall 54 along at least part of the inner side wall 50. Depending on the radius of the curvature of the panel 20 between the top end 22 and the bottom end 24, the transitional portion may not necessarily extend along the entire length of the panel 20. Thus, in one embodiment, transitional portions 32 are provided at the top end 22 and the bottom end 24 of the panel 20. The transitional portion 32 is widest at the ends 22, 24 of the panel 20 and transitions or tapers to a corner-shape 33 formed between the first 52 and second 54 walls. It should be appreciated that the corner-shape 33 may include a minimal fillet for manufacturability. In another embodiment, the transitional portions 32 are generally tangential with respect to the first wall 52 and/or second wall 54 of the inner side wall 50. The transitional portion 32 extends along a compound curve, with a first portion **32*a* of the curve being substantially centered about a cam axis 86 (FIGS. 6-7) and tangential to the first wall 52, and a second portion 32*b* of the curve being tangential to both the first portion 32*a* and the second wall 54. In still another embodiment of the invention, the transitional portion 32 is arcuate in the longitudinal direction of the panel 20 and is generally tangential to the longitudinal curve of the panel 20, which facilitates removal of the finished panel 20 from the stamping tool 70**.

Figure 4:
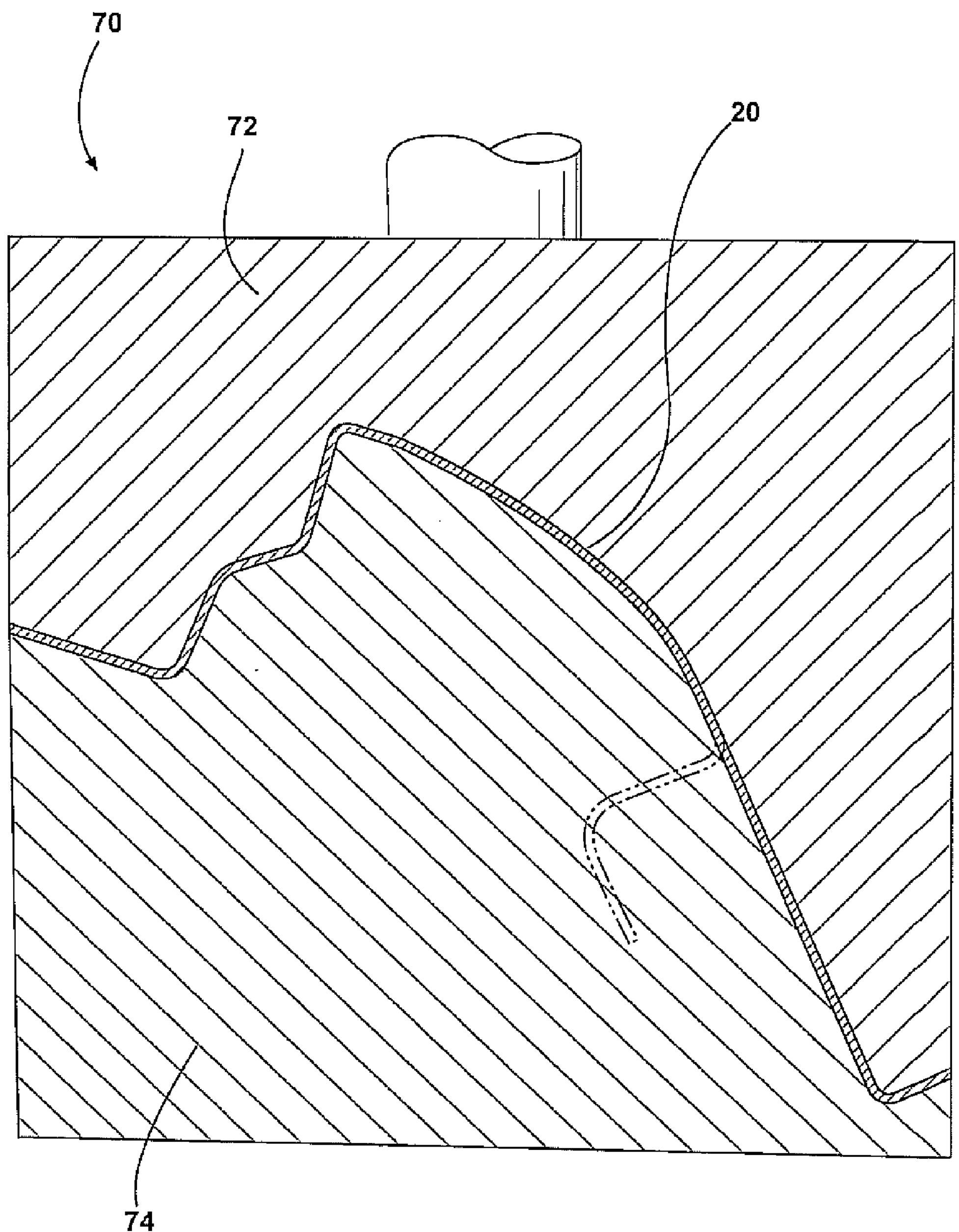
FIG. 4 is a cross sectional view of the panel partially formed and a stamping tool for forming a portion of the panel from a blank of sheet metal.
Figure 5:
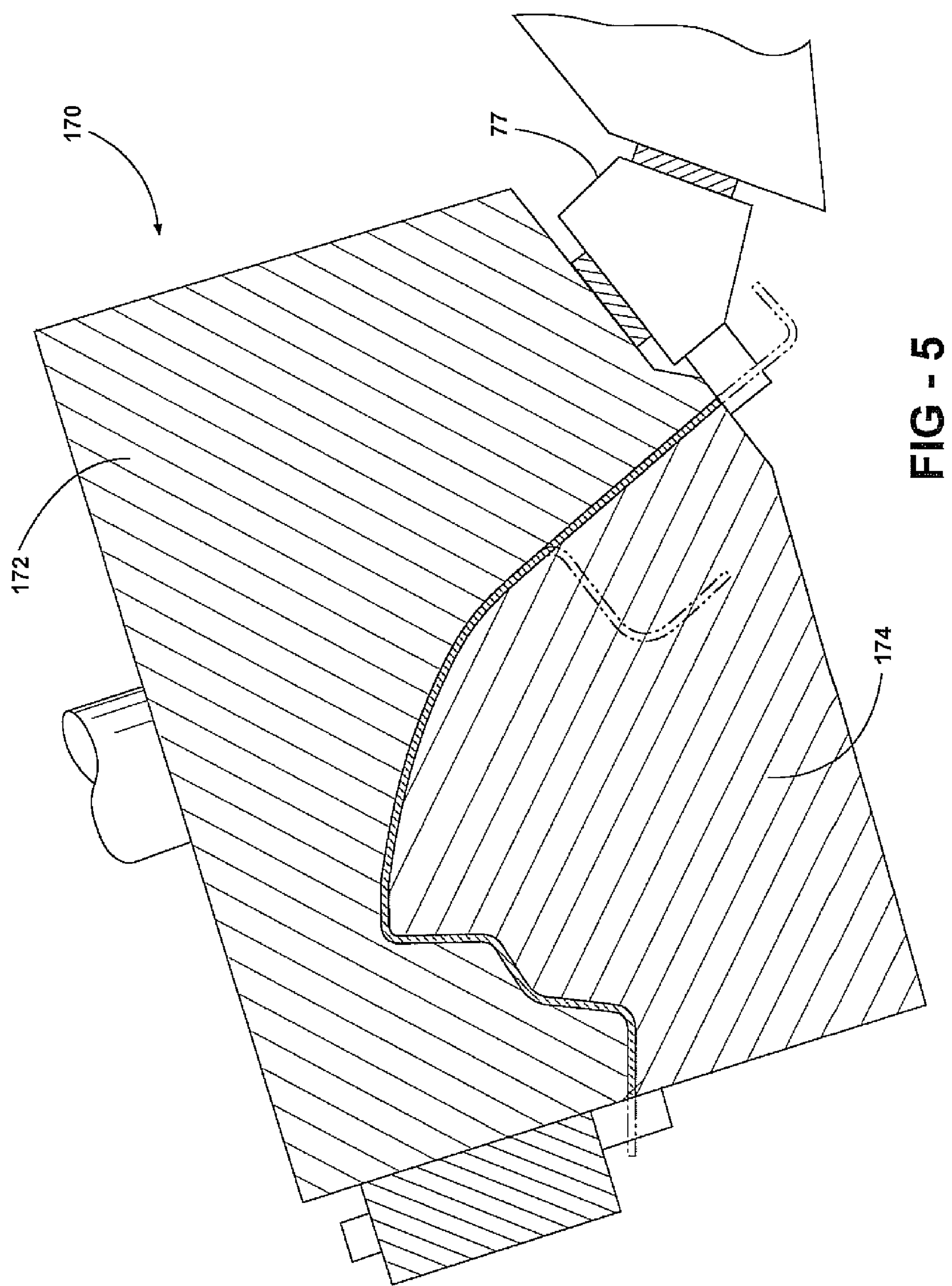
FIG. 5 is a cross sectional view of the panel partially formed and a tool for removing excess material from a portion of the panel.
Figure 6:
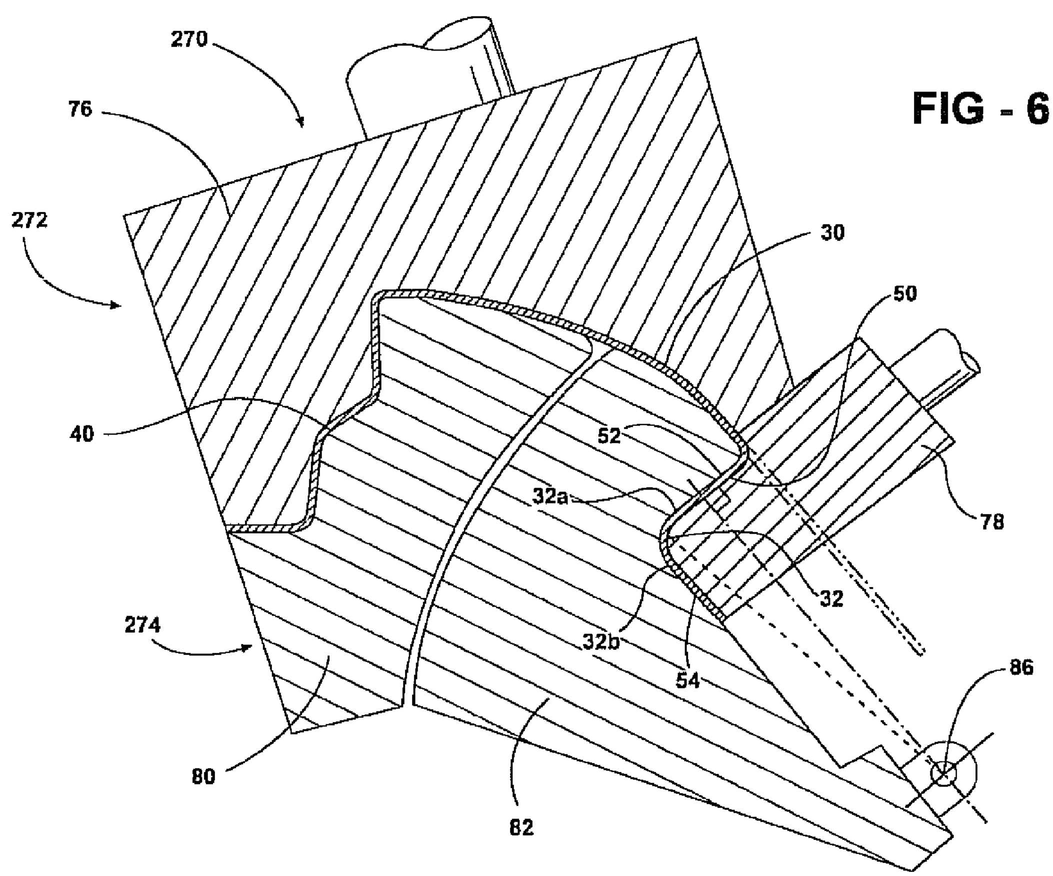
FIG. 6 is a cross sectional view of the panel and a tool for forming a window supporting wall of the panel.

In FIGS. 4-6, a process for forming the panel 20 from a blank sheet of steel is illustrated. Referring to FIG. 4, a panel stamping tool 70 is illustrated. The stamping tool 70 includes an upper die 72 and a lower die 74 which can be pressed toward each other to form a portion of the panel 20 from a blank sheet of steel. The dotted lines in FIGS. 4-5 indicate the intended final form of the panel 20. Referring to FIG. 5, the partially formed panel 20, as formed in the process illustrated in FIG. 4, is supported between upper and lower dies 172, 174 of a second tool 170. A salvage end 79 of the panel 20 is cut using a cutting die 77.

Figure 7:
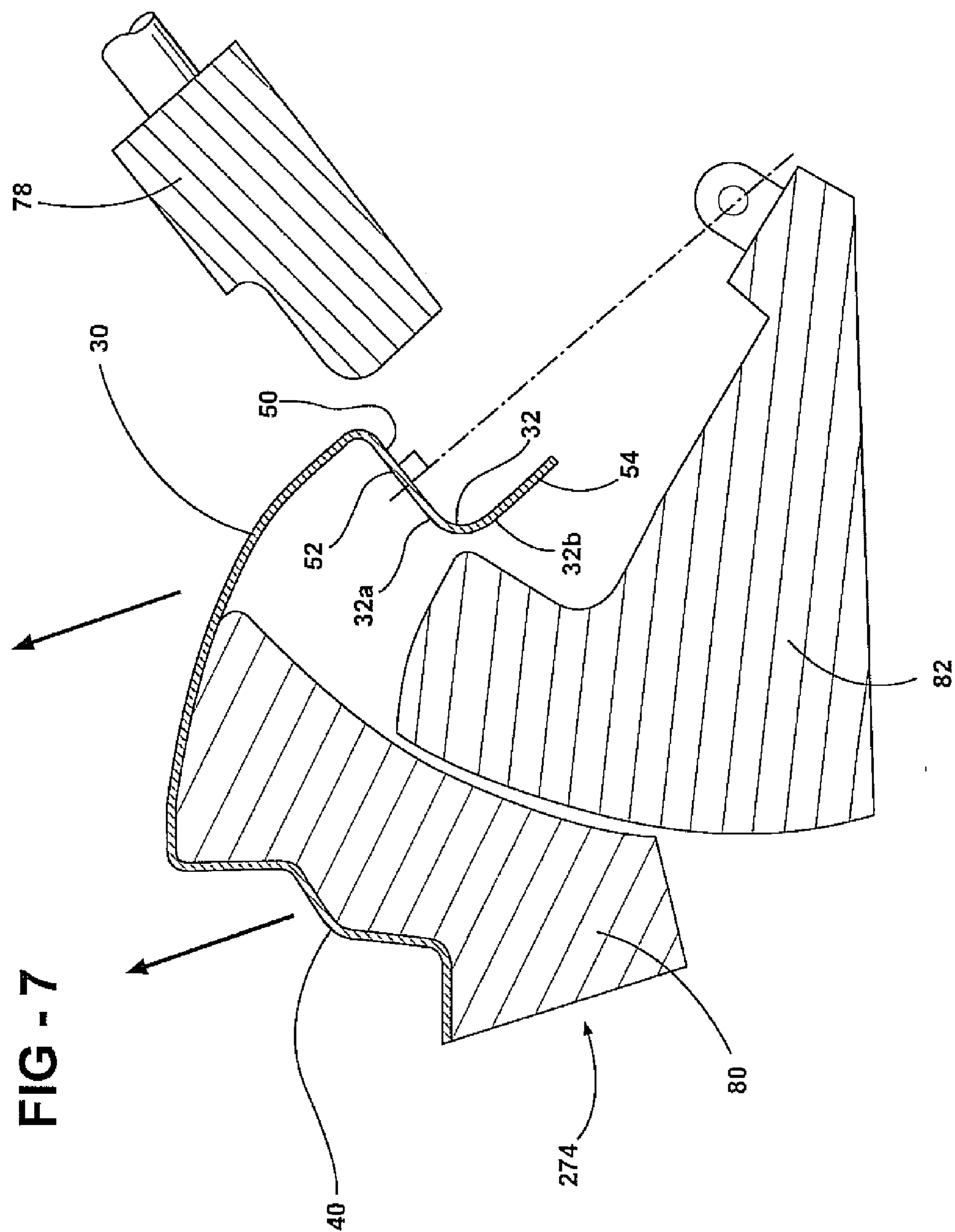
FIG. 7 is a cross sectional view of the panel and tool showing retraction of a rotating cam of a lower die of the tool.

Referring to FIG. 6, the partially formed panel 20 is then placed between the upper and lower dies 272, 274 of a third tool 270. The upper die 272 includes a first portion 76 and a second portion 78. The lower die 274 includes a first part 80 and a second part 82. The first and second portions 76, 78 of the upper die 272 and the first part 80 of the lower die 274 may be movable along generally linear paths. Alternatively, other movements of these die components 76, 78, 80 are possible and/or one or more of these die components 76, 78, 80 may be fixed. The second part 82 of the lower die 274 is rotatable about a rotational axis 86 between a use position, as shown in FIG. 6, and a retracted position, as shown in FIG. 7.

The first portion 76 of the upper die 272 and the lower die 274 of the third tool 270 are pressed toward each other to support the partially formed panel 20 therebetween. At this point, the second part 82 of the lower die 274 is in the use position. The second portion 78 of the upper die 272 is then pressed toward the second part 82 of the lower die 274 to form a remaining portion of the main wall 30 and the inner side wall 50, as shown in FIG. 6. The dotted lines in FIG. 6 indicate the portions of the panel 20 prior to being pressed between the second portion 78 of the upper die 272 and the second part 82 of the lower die 274.

With the panel 20 formed, the upper die 272 can be moved away from the lower die 274 to allow removal of the panel 20 from between the upper and lower dies 272, 274. Due to the negative angle of the side walls 40, 50 relative to the main wall 30, however, the second part 82 of the lower die 274 must first be rotated about the axis 86 to the retracted position, as illustrated in FIG. 7, before the panel 20 can be removed from the tool 270. The transitional portion 32 adjacent the top and bottom ends 22, 24 of the panel 20 allows the second part 82 of the lower die 274 to rotate about the axis 86 without interfering with the side wall 50.

As mentioned, the transitional portion 32 facilitates removal of the finished panel 20 from the tool by allowing retraction of the second part 82 after formation of the panel 20. Additionally, the transitional portion 32 provides greater flexibility in the location of the rotational axis 86 of the second part 82 of the lower die 274. Placing the rotational axis "below" (as viewed from the orientation of the figures) the second wall 54, in general, allows the design of a substantially flat window seal surface along the first wall 52. Such placement of the rotational axis, however, may result in a large unsupported portion of the panel, interference between the second part 82 and the other portions of the panel 20, such as the outer side wall 40, and/or not enough tool to support part of the inner side wall 50 during formation. A conventional step may be placed at the intersection between the first wall 52 and the second wall 54 to allow higher positioning of the rotational axis 86, but this can generally reduce the amount of flat window seal surface along the first wall 52, and reduce the flange flat area along the second wall 54.

Providing the transitional portion 32, as discussed herein, between the first wall 52 and the second wall 54 allows optimization of the amount of flat window seal surface along the first wall 52 while meeting other stamping or formability requirements, such as avoiding die-lock conditions or minimizing the amount of unsupported areas along the panel during the stamping process. The transitional portion 32 also allows maximization of the flat area along the second wall 54 for supporting and attaching the glass to the vehicle body. Maximizing the flat area allows the window support flange length to be minimized. Minimizing window support flange length, in turn, decreases the size of the pillar as an obstruction to the view of the driver and reduces overall vehicle mass.

Figure 8:
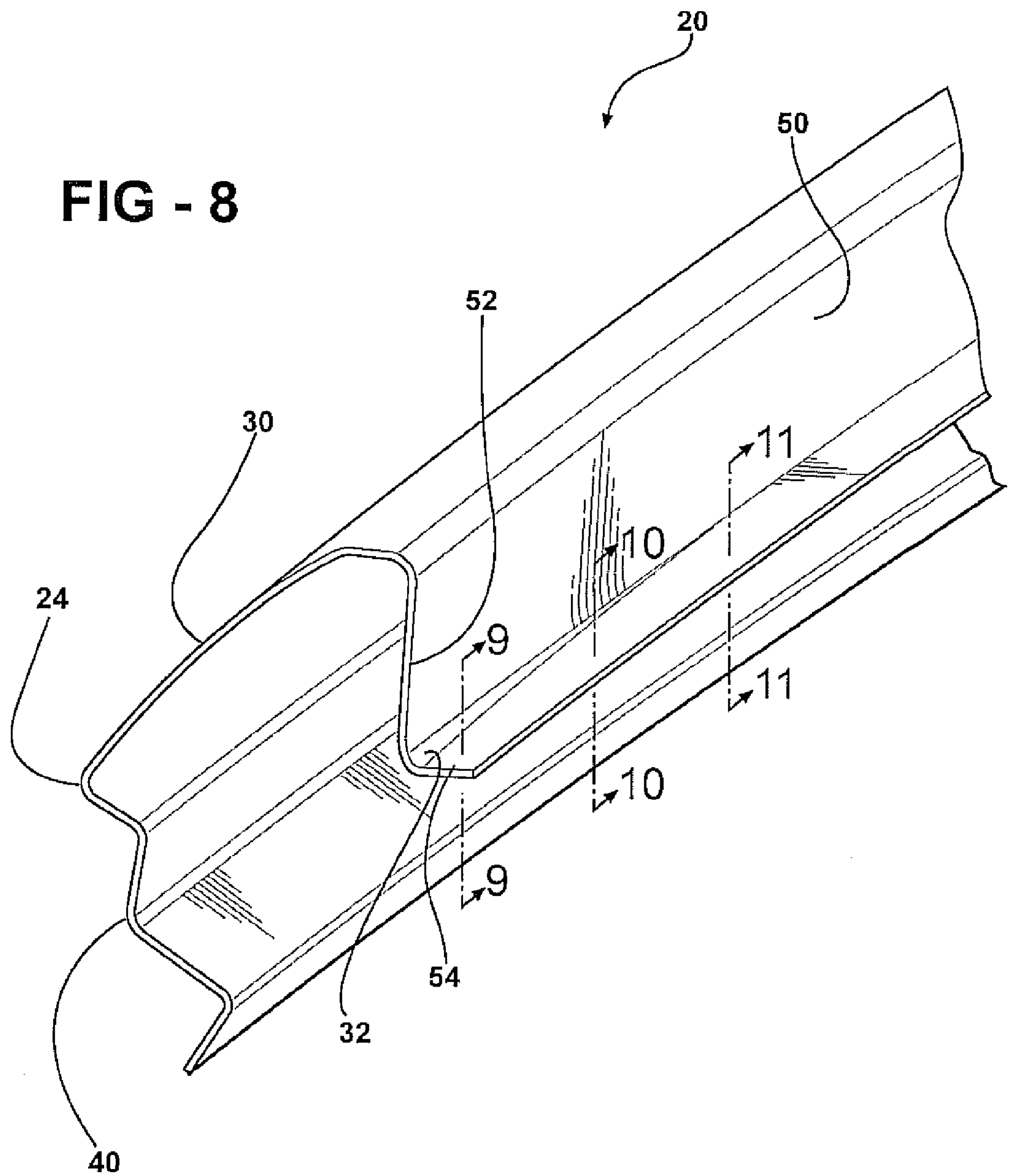
FIG. 8 is a perspective view of a panel showing the dies removed.

With reference now to FIG. 8, an exploded view of an end of the arcuate panel 20 with the dies removed is provided. As discussed above, the stamping tool 70 is operable to form an arcuate panel 20 having a pair of opposing side walls 40, 50 so as to form a u-shaped cross-section. More specifically, the panel 20 includes an inner side wall 50 opposite an outer side wall 40. The side walls 40, 50 are angled towards each other so as to form a "negative" angle. The inner side wall 50 includes a first wall 52 and a second wall 54 generally perpendicular to the first wall 52. The stamping tool 70 further forms a transitional portion 32 disposed on opposing ends of the panel 20 so as to avoid a die lock condition.

Figure 9:
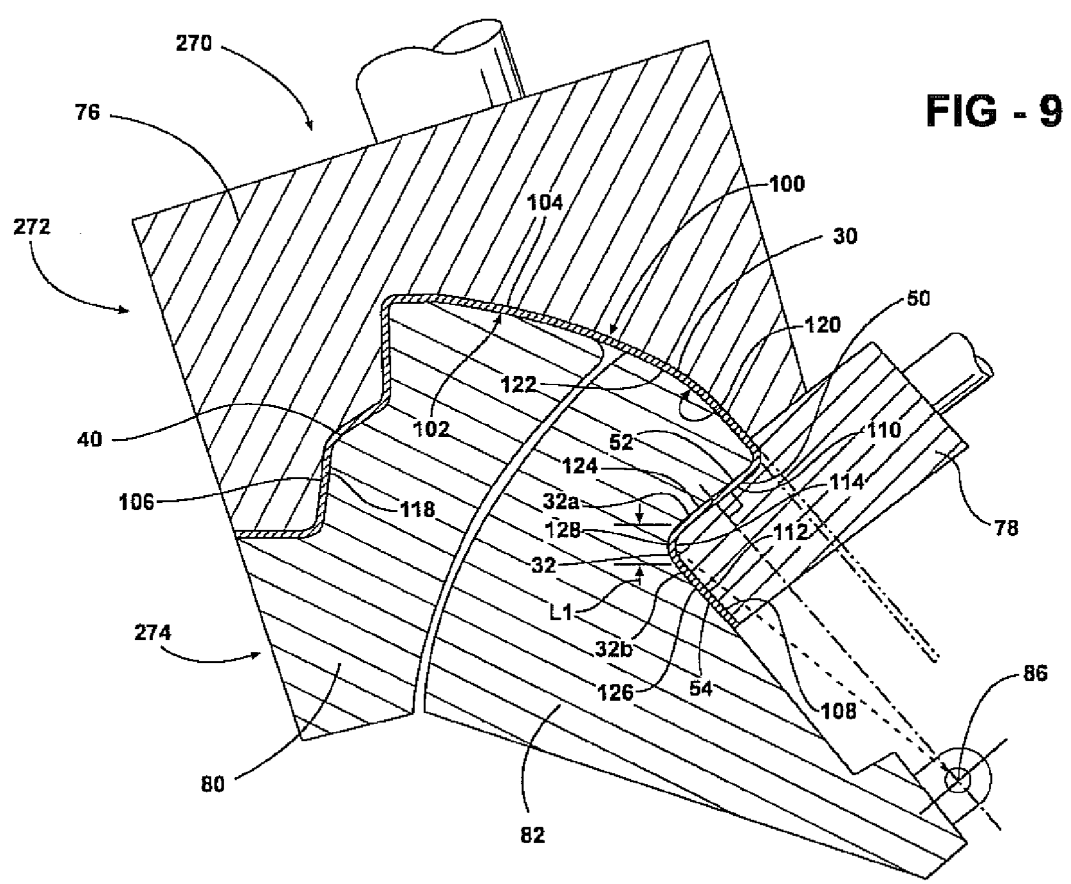
FIG. 9 is a cross sectional view of the panel of FIG. 8 taken along lines 9-9, showing the stamping tool in the use position.

With reference now to FIG. 9, a cross-sectional view taken of the stamping tool 270 for forming the part of the panel taken along lines 9-9 shown in FIG. 8 is provided. Each end of the stamping tool 270 is symmetrical to the other, thus an explanation of one end is sufficient to describe the other. The stamping tool 270 includes an upper die 272 having an upper die surface 100 and a lower die 274 having a lower die surface 102. The upper die 272 includes a first portion 76 and a second portion 78. The first portion 76 of the upper die surface 100 includes an outer main wall surface 104, and an outer side wall surface 106. The outer main wall surface 104 is bowed so as to form the arcuate panel 20. Accordingly, the outer main wall surface 104 of the upper die 272 extends arcuately between opposing ends of the upper die surface 100.

The second portion 78 includes a second portion surface 108 (also referenced as a first outer wall surface) operable to form the outer surface of the inner side wall 50 of the panel 20. The second portion 78 is displaceable with respect to the upper die 272. The second portion 78 includes an outer first wall surface 110 and an outer second wall surface 112 generally perpendicular to each other. The second portion 78 further includes an outer transitional portion surface 114 disposed on each end of the second portion 78. The outer transitional portion surface 114 tapers to an outer corner surface 116. The outer transitional portion surface 114 is angled relative to the outer first and second wall surfaces 110, 112.

The lower die 274 includes a first part 80 and a second part 82. The first part 80 includes a first part surface 118. The lower die 274 is operable to form the inner surface of the panel 20. The blank sheet of metal is pressed between the upper die 272 and the first part 80 of the lower die 274 so as to form a portion of the main wall 30 and the outer side wall 40. Specifically, the first part surface 118 forms the inner surface of the outer side wall 40 and a portion of the main wall 30, and the upper die surface 100 forms the outer surface of the outer side wall 40 and a portion of the main wall 30.

The second part 82 includes a second part surface 120 having an inner main wall surface 122, inner first wall surface 124, inner second wall surface 126 and inner transitional portion surface 128 disposed on respective ends of the second part 82. The inner first and second wall surfaces 124, 126 are generally perpendicular to each other. The inner transitional portion surface 128 extends between the inner first and second wall surfaces 124, 126. The inner transitional portion surface 128 tapers to an inner corner surface 130. The inner transitional portion surface 128 is angled relative to the first and second wall surfaces 124, 126. The second part 82 is operable to be rotated and pressed up against the second portion 78 of the upper die 272 so as to form the remaining portion of the main wall 30 of the panel 20.

In operation, the stamping tool 270 is movable between a use and free position. In the use position, the blank sheet of metal is pressed between upper and lower dies 272, 274. In the free position, the upper and lower dies 272, 274 are displaced from each other to all for the placement of the blank sheet of metal. The first part 80 remains stationary and the blank sheet of metal is placed on the first part 80. The upper die 272 is pressed against the first part 80 so as to form the outer side wall 40 and a portion of the main wall 30 of the panel 20.

Figure 10:
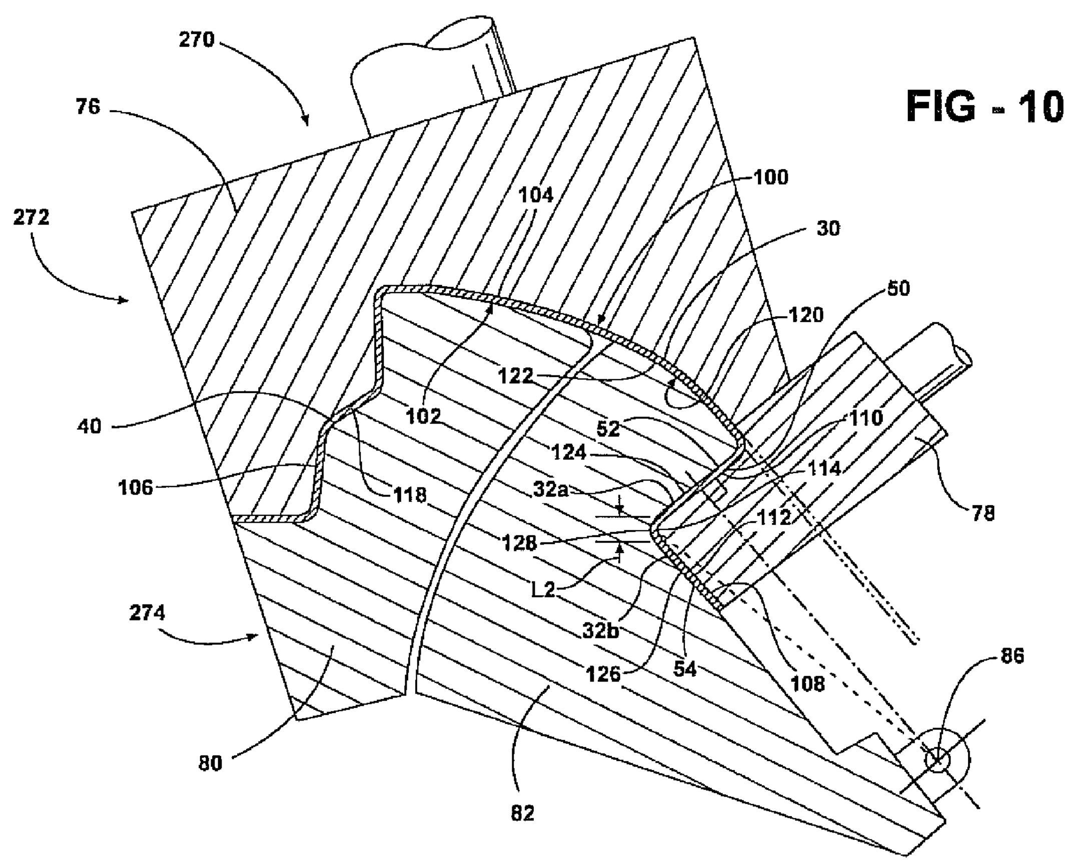
FIG. 10 is a cross sectional view of the panel of FIG. 8 taken along lines 10-10, showing the stamping tool in the use position.
Figure 11:
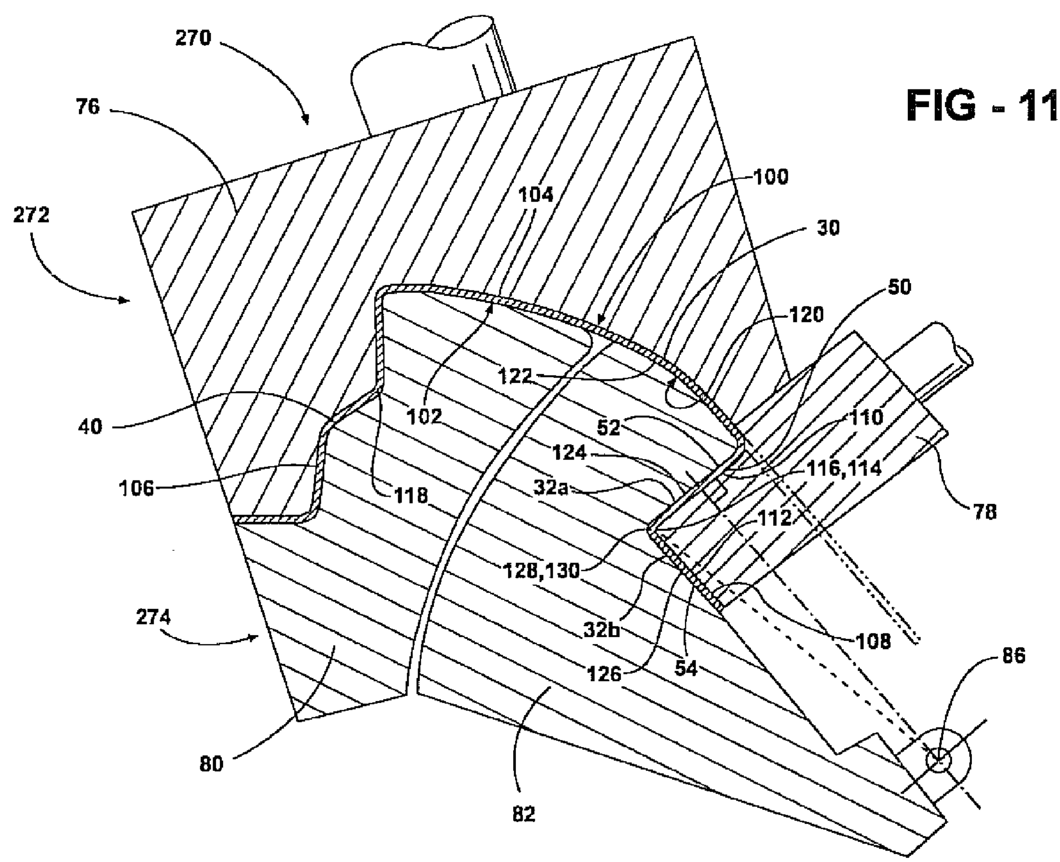
FIG. 11 is a cross sectional view of the panel of FIG. 8 taken along lines 11-11, showing the stamping tool in the use position.

The stamping tool 270 then actuates the second part 82 of the lower die 274. The second part 82 is rotatable with respect to the upper die 272. The second part 82 is rotatable about a rotational axis 86 between a use position, as shown in FIG. 6, and a retracted position, as shown in FIG. 7. As illustrated in FIGS. 9-11, the rotational axis 86 is above the outer second wall surface 112 at a point where a line that is generally parallel and spaced above the inner second wall surface 126 intersects with a line extending angularly from an intersection between the inner first wall surface 124 and the inner transitional portion surface 128 as defined in a cross section of the tool 270 taken along a plane orthogonal to the rotation of the second part 82 of the lower die 274. The second portion 78 of the upper die 272 is then pressed towards the second part 82 of the lower die 274 so as to form the first and second walls 52, 54 and transitional portion 32 of the panel 20. With reference now to FIGS. 9-11 a cross-sectional view of an end of the stamping tool 270 showing the configuration of the surfaces 100, 102 of the upper and lower dies 272, 274 is provided. The Figures shows the stamping tool 270 in a pressed or use position, wherein the upper die and lower die 272, 274 are pressed together with the blank sheet of metal disposed between the dies. FIGS. 9-11 are also illustrative of the tapering nature of respective inner and outer transitional portion surfaces.

With reference first to FIG. 9, a distal end of the inner and outer transitional portion surfaces 128, 114 of respective lower and upper dies 272, 274 is provided. The opposing distal end is symmetrical, and thus an explanation of one distal end is sufficient to describe the other. The width of respective inner and outer transitional portion surfaces 128, 114 is indicated by "L-1." The inner and outer transitional surfaces 128, 114 are bowed as shown in the cross-sectional views. With reference now to FIG. 10, the width of respective inner and outer transitional portion surfaces 128, 114 is indicated by "L-2." The inner and outer transitional surfaces 128, 114 taken along lines 10-10 are bowed more than the inner and outer transitional surfaces 128, 114 taken along lines 9-9. It should also be appreciated that the width of the transitional surface taken along lines 9-9, "L-1," is longer than the width taken along lines 10-10, "L-2." With reference now to FIG. 11, respective inner and outer transitional portion surfaces extend to respective inner and outer corner surfaces.

The stamping tool 270 of the present invention, as discussed above, provides a number of advantages over conventional designs. For example, the stamping tool of the present invention allows for the design of a single cam in a stamping tool 70 to form a longer portion of a part where conventional tools would otherwise utilize a plurality of cams to form the same portion of the part. Minimizing the number of cams in a tool lowers tooling costs and processing time during production and, therefore, significantly reduces costs.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A stamping tool for forming an arcuate panel having a main wall, and an inner side wall spaced apart an outer side wall, the inner and outer side walls extending from the main wall so as to form a u-shaped cross-section, the inner and outer side walls are angled toward each other, the stamping tool configured so as to prevent a die lock condition, said tool comprising:

an upper die having a first portion having an outer side wall surface and a second portion having an outer first wall surface and an outer second wall surface, the outer first wall surface generally orthogonal to the outer second wall surface, an upper die surface extending along both the first and second portions, the upper die surface having an outer main wall surface extending arcuately between opposing ends of the upper die surface and also between the outer side wall surface of the first portion and the outer first wall surface of the second portion, the second portion further including an outer transitional portion surface disposed on each end of the upper die surface, the outer transitional portion surface tapers as the outer transitional portion surface extends from the ends of the upper dies surface to an outer corner surface;

a lower die cooperative with the upper die to form the arcuate panel, the lower die having a first part forming the inner surface of the outer side wall of the panel and a second part forming the inner surface of the inner side wall of the panel, the first part being fixed in position, the first and second portions of the upper die displaceable along an axis with respect to the first part of the lower die, the second part of the lower die being rotatable about a rotational axis, and displaceable with respect to the first part, wherein the rotational axis of the second part of the lower die is above the inner second wall surface at a point where a line that is generally parallel to and spaced intersects with a line, extending angularly from an intersection between the inner first wall surface, and the inner transitional portion surface as defined in a cross section of the tool taken along a plane orthogonal to the rotation of the second part of the lower die.

2. A stamping tool as set forth in claim 1, wherein the outer transitional portion surface is substantially tangential with respect to a longitudinal arc of the arcuately extending outer main wall surface.

3. A stamping tool as set forth 1, wherein the outer first wall surface extends at a substantially obtuse angle with respect to the outer main wall surface.

4. A stamping tool as set forth in claim 1, wherein the outer transitional portion surface includes an outer surface, and the outer surface extends along a curve that is substantially compound.

5. A stamping tool as set forth in claim 4, wherein the curve includes a first portion tangential with the outer first wall surface.

6. A stamping tool as set forth in claim 5, wherein the curve includes a second portion tangential with both the first portion of the curve and the second wall surface.

7. The stamping tool as set forth in claim 1, wherein the outer main wall surface is disposed on the first portion of the upper die.

8. The stamping tool as set forth in claim 1, wherein the second part of the lower die includes a second part surface having an inner main wall surface, inner first wall surface, inner second wall surface and inner transitional portion surface disposed on respective ends of the second part, the inner first and inner second wall surfaces are generally perpendicular to each other, and the inner transitional portion surface extends between the inner first and second wall surfaces and tapers to an inner corner surface.

* * * * *

UNITED STATES PATENT AND TRADEMARK OFFICE

CERTIFICATE OF CORRECTION

PATENT NO. : 8,516,874 B2
APPLICATION NO. : 12/815192
DATED : August 27, 2013
INVENTOR(S) : Moore et al.

It is certified that error appears in the above-identified patent and that said Letters Patent is hereby corrected as shown below:

In the Claims:

At column 6, claim number 1, line number 54, Delete “dies”, Insert --die--.

At column 7, claim number 3, line number 9, After forth, Insert --in claim--.

Signed and Sealed this
Nineteenth Day of August, 2014

Michelle K. Lee
*Deputy Director of the United States Patent and Trademark Office*